(12) United States Patent
Heitz et al.

(10) Patent No.: US 8,326,036 B2
(45) Date of Patent: Dec. 4, 2012

(54) AUTOMATED IMAGE SEPARATION METHOD

(75) Inventors: Geremy Heitz, Menlo Park, CA (US); Gal Chechik, Sunnyvale, CA (US)

(73) Assignee: Qylur Security Systems, Inc., Palo Alto, CA (US)

( * ) Notice: Subject to any disclaimer, the term of this patent is extended or adjusted under 35 U.S.C. 154(b) by 935 days.

(21) Appl. No.: 12/390,358

(22) Filed: Feb. 20, 2009

(65) Prior Publication Data

US 2010/0215249 A1 Aug. 26, 2010

(51) Int. Cl.
*G06K 9/34* (2006.01)
(52) U.S. Cl. ...................................................... 382/173
(58) Field of Classification Search ................... 382/100, 382/128, 131–132, 141, 173, 181; 250/394; 378/4, 19–21, 37, 41–43, 51–55, 62, 205–208; 600/424–427
See application file for complete search history.

(56) References Cited

U.S. PATENT DOCUMENTS

| | | | |
|---|---|---|---|
| 4,422,146 A | 12/1983 | Yamaguchi et al. | |
| 5,796,802 A | 8/1998 | Gordon | |
| 6,088,423 A | 7/2000 | Krug et al. | |
| 6,763,083 B2 | 7/2004 | Fernandez | |
| 7,412,427 B2 * | 8/2008 | Zitnick et al. | 706/20 |
| 7,590,218 B2 * | 9/2009 | Scherch et al. | 378/65 |
| 7,657,075 B2 * | 2/2010 | Viswanathan | 382/132 |
| 7,761,466 B1 * | 7/2010 | Eshghi | 707/772 |
| 7,844,094 B2 * | 11/2010 | Jeung et al. | 382/131 |

OTHER PUBLICATIONS

Gal Chechik; Geremy Heitz, "Method for automated segmentation of objects in x-ray scans using multiple acquisitions", Dec. 2007, 6 pages.

Harold G. Longbotham; Hemal n. Kothari; Ping Yan, "X-Ray Stereo Imaging Technique for Disparity Analysis", Eighth IEEE Symposium on Computer-Based Medical Systems, pp. 24-26, 1995.

Zhang, sen; Li, wan-qing, "Extraction of 3-D Measurements from Stereo X-Ray Images", Computer Science Department, Hongzhou University Hongzhou, China, 1988 IEEE, pp. 629-632.

Alexander B. Konovalov, Dmitry V. Mogilenskikh, Vitaly V. Vlasov; Andrey n. Kiselev, Algebraic Reconstruction and Post-processing in Incomplete Data Computed Tomograhy: From X-rays to Laser Beams, Russian Federal Nuclear Centre-Zababakhin Institue of Applied Physics, Russia, Chapter 26, pp. 487-518, 2007.

Naoya Ohta, Kenji Mogi, Yoshiki Nakasone, "Three Dimensional Position Measurement for Maxillofacial Surgery by Stereo X-Ray Images", Y. Yagi et al. (Eds.): ACCV 2007, Part II, LNCS 4844, pp. 528-537, 2007.

Yong-Suk Kim; Kyu-Phil Han; Eung-Joo Lee; Yeong-Ho Ha, Robust 3-D Depth Estimation Using Genetic Algorithm in Stereo Image Pairs, Proceediings of IEEE Asia Pacific Conference on Circuits and Systems '96 Nov. 18-21, 1996, Seoul, Korea, pp. 357-360.

Daniel Scharstein, Dept. of Math and Computer Science, Middlebury College, Middlebury, VT; Richard Szeliski, Microsoft Research, Microsoft Corporation, Redmond, WA, "A Taxonomy and Evaluation of Dense Two-Frame Stereo Correspondence Algorithms", 35 pages, 2002.

\* cited by examiner

*Primary Examiner* — Jose Couso
(74) *Attorney, Agent, or Firm* — Innovation Counsel LLP (57) ABSTRACT

A method of decomposing a set of scans of different views of overlapping objects into constituent objects is presented. The method involves an initialization process whereby keypoints in two views are determined and matched, disparity between keypoint pairs are computed, and the keypoints are grouped into clusters based on their disparities. Following the initialization process is an iterative optimization process whereby a cost function is calculated and minimized assuming a fixed composition matrix and re-solved assuming a fixed attenuation coefficient. Then, the composition matrix and the attenuation coefficient are updated simultaneously, and the solving, the re-solving, and the updating steps are repeated until there is no significant improvement in the result.

25 Claims, 7 Drawing Sheets

AUTOMATED IMAGE SEPARATION METHOD

FIELD OF THE INVENTION

The invention relates generally to a method of separating overlapping objects in an image, and more specifically to the separation of overlapping transparent or attenuating objects in images.

BACKGROUND

Many security systems today seek to automatically detect threats such as guns, knives, and explosives using an x-ray imaging system. In particular, the use of dual energy x-ray imaging is often desirable because it allows for the determination of chemical properties of the objects in the scan, such as atomic number and mass density. Dual-energy x-ray imaging is typically performed using a full 3D reconstruction (e.g., a CT image) of the scanned object, and entails obtaining a very large number of scans of the static object. Using the large number of scans, the system is able to identify physical properties of the material at each point in space.

However, systems performing a full 3D reconstruction are generally too slow and expensive to be used for high-throughput applications. Thus, there is a need for methods that operate with a smaller number of views. Some known methods perform a coarse 3D reconstruction using an algebraic reconstruction technique with a limited number of views. One method uses three views to match outlines of objects between views and estimate a rough 3D shape of the objects. Another method uses two views to produce a stereoscopic x-ray image for viewing. These methods rely on knowing the precise angles of the views, and having the scanned objects remaining static between these views.

Fusing the information from multiple views allows for a better interpretation of the images than considering each angle in isolation. For the fusing to be performed effectively, a method for extracting data from multiple views while relaxing the strict requirements of known viewpoint or stationary rigid objects is desired. In the case of natural images, stereo vision methods have been developed that allow for less restricted and even unknown viewing angles (possibly solving for the viewing angle in the process) or for handling objects that move between images acquired from the same view. Typically, these methods are used to estimate the 3D structure of the scene in the form of a depth map.

Generally, stereo methods are more flexible than current x-ray reconstruction techniques, since they imply weaker assumptions on how images are acquired. However, there are significant obstacles to applying existing stereo methods from computer vision directly to x-ray images. First, x-ray systems produce transmission images obtained by transmission of waves that are attenuated as they pass through objects. Hence, unlike in standard vision obtained by light reflection, where an opaque object occludes all the objects that are behind it, objects in an x-ray scan look as though they are semi-transparent and overlapping. The attenuation captured in an x-ray image is additive: the attenuation value at every pixel of the attenuation image is a linear combination of the attenuation from multiple "overlapping" objects that the wave passed through on its way from the source to the sensor. A second obstacle in applying existing stereo methods to the current problem is that many of the applicable existing methods do not yield accurate results when the angle between views is unknown and/or the objects move between views.

The general concept of capturing multiple images with a small angle offset for the purposes of stereoscopic imaging has been disclosed. However, these disclosures describe a physical method of obtaining the images without any reference to how the images would be analyzed. A method and apparatus that allows analysis of overlapping objects in an image in an accurate yet cost-effective manner is desired.

SUMMARY

In one aspect, the invention is a method of decomposing a Small Angle Transmission Image Set (SATIS), composed of multiple views containing overlapping objects, into its constituent objects. The method involves determining a first set of keypoints in one view and a second set of keypoints in a second view, wherein the first view and the second view are taken of same set of objects from different positions. The first keypoints are matched to the second keypoints to generate keypoint pairs. A disparity between each of the keypoint pairs is computed, wherein the disparity is a distance between a location of a keypoint in the first view and a location of a matching keypoint in the second view, and the keypoints are grouped into clusters using Disparity-Enabled Clutering of Keypoints (DECK).

In another aspect, the invention is a computer readable medium storing computer-executable instructions for the above method.

In yet another aspect, the invention is a method for refining a SATIS decomposition into objects having consistent attenuation values. The method involves determining a composition matrix $C_v$ containing optimization variables relating to the pixel composition of the objects from the initial decomposition. The method also involves determining an object attenuation vector $\phi$ containing optimization variables relating to the attenuation of the objects in the image set. The method initializes these quantities using DECK as described above, and then performs an iterative procedure for simultaneously solving for the composition matrix $C_v$ and the object attenuation vector $\phi$.

The invention also includes a computer readable medium storing computer executable instructions for the above method of refining a SATIS decomposition into objects having consistent attenuation values.

DETAILED DESCRIPTION OF THE INVENTION

As used herein, "transmission image" is intended to mean an image obtained by transmission of waves that are attenuated as they pass through objects, creating the "additivity" phenomenon where overlapping objects contribute linearly to attenuation at a pixel. "Small Angle Transmission Image Set"

(SATIS) is intended to mean a set of transmission images of the same scene taken from different angles. A "view" is an image in the scan (taken from some angle). "Clustering" refers to grouping points together based the similarity of their characteristics. A "keypoint" refers to a pixel in the image that has a distinct texture or pattern. "Region intensity" refers to the mean pixel intensity in image region i of view v, denoted by $l_{v,i}$. A "composition matrix" ($C_v$) is a matrix indicating which objects contribute to which regions for view v. The matrix has dimensions #objects×#regions, and each entry in the matrix is a binary value {0,1}. Values can also be relaxed to a continuous value between zero and one. "Object attenuation vector" is a vector giving the attenuations of the various objects in the scan, denoted by $\phi$. This vector is of length #objects.

The current invention discloses a new optimization method for decomposition of Small Angle Transmission Image Sets (SATIS) to produce an object-level decomposition of the data in the images. The method parameterizes images in a way that captures their object structure. This parameterization allows an estimation of the physical properties (such as atomic number and density) of the objects present in a set of transmission images, without requiring a full 3D reconstruction, and provides improvement in accuracy compared to a single view.

The invention has the advantages of bypassing the need for a full 3D reconstruction by using a new object-based decomposition method that produces image features enabling the detection of objects. Furthermore, the current invention has the advantage of effectively handling overlapping objects in transmission images through the use of small angles. In addition, the current invention has the advantage of allowing the obtained images to be used even when objects have shifted in space, or when there is a variation in angles, by using a system that does not rely on a static object.

Although the invention is herein described in the context of x-ray images, this is not a limitation of the invention, which can be applied to other image-based diagnostic systems that use images based on transmission (meaning that overlapping objects yield an additive measurement). For instance, when taking photographs through a transparent material like glass, the result is often an additive mixture of objects behind the glass, and the reflected image.

The invention is a decomposition method that receives SATIS data of an object or collection of objects as input and produces 1) a list of objects with their attenuations and 2) the composition of each region in the image, indicating which object contributed to the intensity in that region. The apparatus defines an "object" as a part of the scanned material that (1) yields a fairly homogeneous attenuation in a scan and (2) moves as a single unit of matter relative to other objects. An object may be deformable, for instance, the body of water in a water bottle. The decomposition is based on the process that generates a transmission image. In particular, we have a set of images that is generated from a relatively small number of objects viewed from different angles. A "small number" of objects means a number that is significantly smaller than the number of pixels in a single image or voxels in a corresponding CT scan. Because angle differences are small, the thickness of each object is approximated to be constant across the multiple views.

Figure 1:
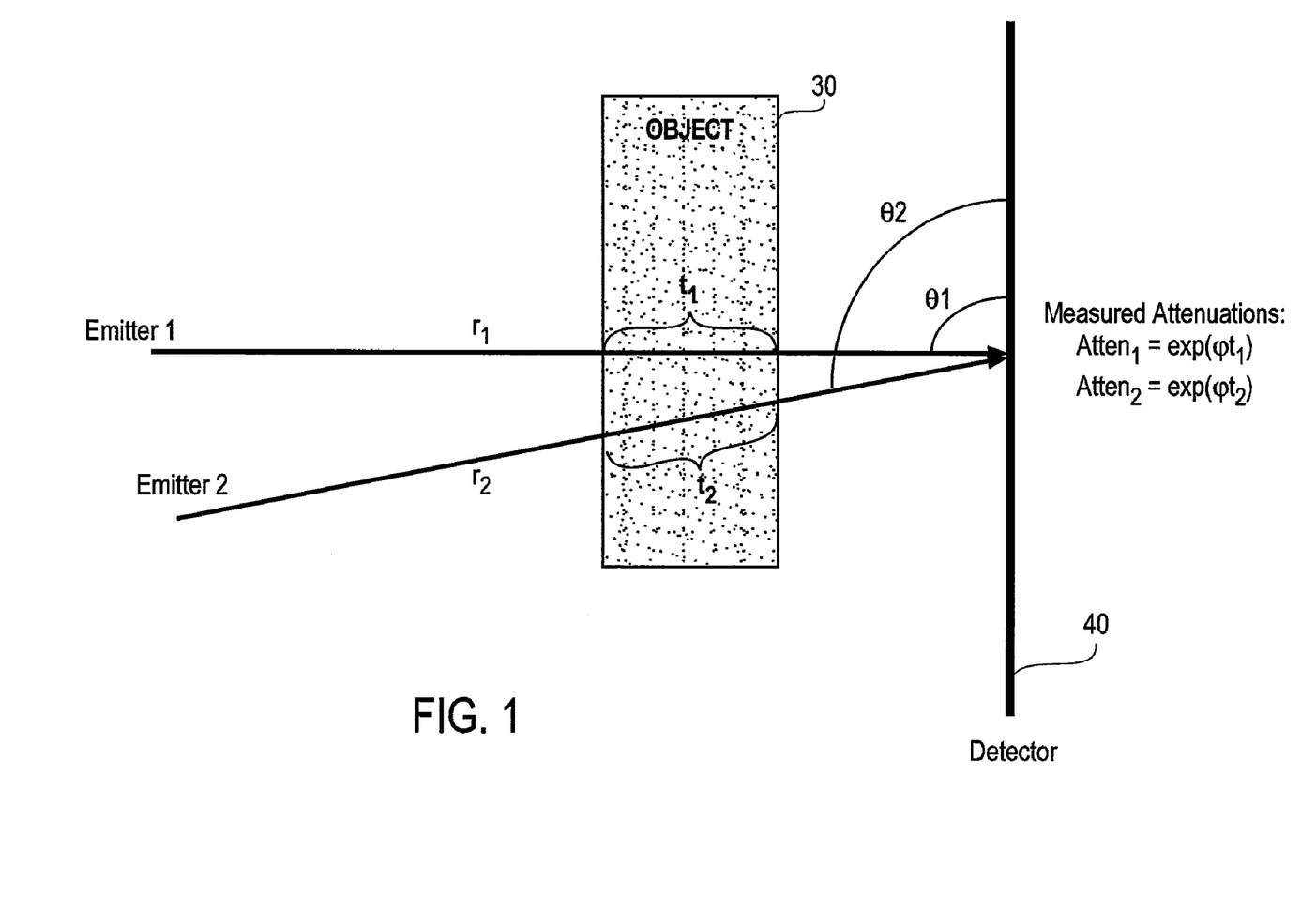
FIG. 1 is a diagram illustrating a generative process that produces the attenuation measurement in accordance with the invention.

FIG. 1 is a diagram illustrating a generative process that produces the attenuation measurement. A first ray $r_1$ and a second ray $r_2$ are emitted toward an object 30 from two positions, one forming an angle $\theta_1$ and another forming an angle $\theta_2$ with respect to a plane of a detector 40. Each of the first and second rays $r_1$, $r_2$ that passes through the object 30 is attenuated by the factor $e^{\phi t_1}$ and $e^{\phi t_2}$, respectively, where $\phi$ is the attenuation coefficient of the object and $t_1$ and $t_2$ are the effective thicknesses of the object. The "effective thickness" is not the actual thickness of the object 30 but the distance through the object 30 that is traveled by a ray. As the angle difference between the two views is small (i.e., $\theta_1$ and $\theta_2$ are close), the effective thicknesses $t_1$ and $t_2$ are similar and the attenuation of the object can be approximated as constant between the two views. This assumption allows all images in the SATIS to be explained using a small number of objects with their attenuations common to all images.

The detector 40 is composed of many sensors, each producing the measurement of a single pixel. The physics of the imaging system imply that the intensity observed at the sensor for pixel p is given by:

$$I(p) \sim I_0 \exp(-c_p^T \phi),$$

where $I_0$ is the full power intensity of the emitted x-ray, ~ means an approximated equality (there is no exact equality due to the effects of sensor noise, beam hardening, etc.), $\phi$ is a vector of the attenuation of each object, and $c_p$ is an indicator column vector for the a pixel p.

Figure 2:
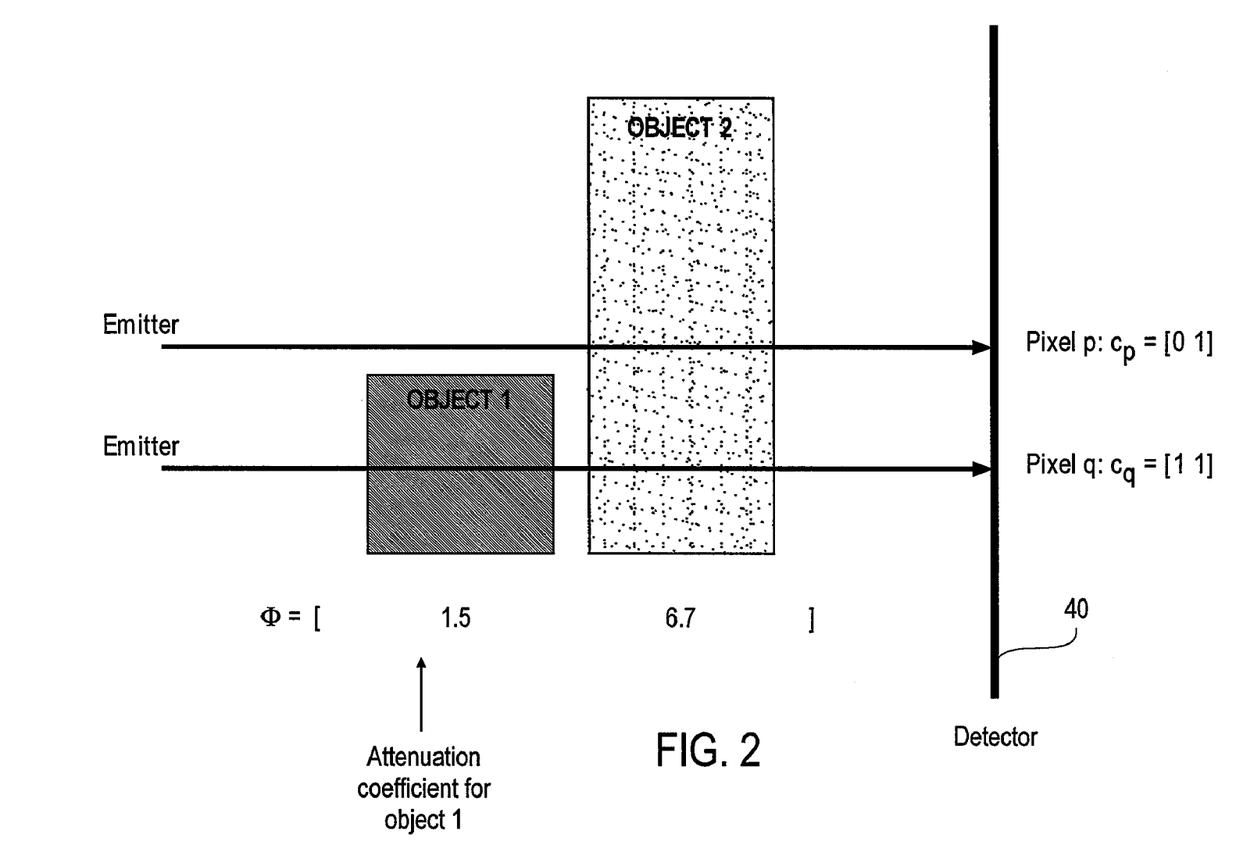
FIG. 2 is a diagram illustrating two objects positioned between an emitter and a detector.

FIG. 2 is a diagram illustrating two objects positioned between an emitter and the detector 40. As illustrated, $c_{p,i}=1$ if the ray associated with pixel p passes through object i, and 0 otherwise. In FIG. 2, $c_p=[0\ 1]$ because the ray for pixel p passes through Object 2 but not object 1. However, $c_q=[1\ 1]$ because the ray for pixel q passes through Object 1 and Object 2. Defining $l_p$ to be the normalized log attenuation at pixel p, it can be obtained by the following:

$$l_p = -\log(I(p)/I_0) \sim c_p^T \phi.$$

Combining all the $c_p$ vectors for all the pixels in an image into a matrix results in the composition matrix C, whose p-th row is $c_p$. Using the subscript v for view v, the log attenuation for a view becomes:

$$l_v = C_v \phi.$$

The invention decomposes the measurements in each $l_v$ into a product of $C_v$ and $\phi$. The method of the invention uses both the observed data and expectations about the similarity between entries of C—referred to here "smoothness"—and about the difference between the C matrices of two different views. These expectations are also known as "priors" in Bayesian statistics, as they probabilistically encode our prior beliefs about the form of C. In particular, a cost function, $f(C, \phi; l_v)$, is defined that encodes a combination of the error induced in reconstructing the images from the parameters as well as the deviation of the parameters from the priors. The cost function is given by:

$$f(C, \varphi; l) = \sum_v \|l_v - C_v\varphi\|^2 + \sum_v \gamma\|S_v C_v\|^2 + \sum_{v,w} \beta\|C_v - T_{wv}C_w\|^2$$

where v and w are pairs of neighboring views, and S is a fixed matrix that enforces a smoothness prior on each single-view C. $T_{wv}$ is a transformation that maps a view w to a view v, such that their difference $\|C_v - T_{wv}C_w\|$ can be penalized. $\gamma > 0$ is the weight of within-scan smoothness penalty, and $\beta > 0$ is the weight of between-scans smoothness penalty. S and T can be calculated in advance, based on the parameters of the scans. The hyper parameters $\gamma$ and $\beta$ can be determined using cross validation and are assumed to be constant.

A SATIS is decomposed into objects using the following optimization problem:

$$\min_{C,\varphi} f(C, \varphi; l) \quad \text{(Equation 1)}$$

$$\text{s.t. } C_{vpi} \in \{0, 1\} \ \forall \ v, i, p$$

Solving this problem requires searching for the parameters that minimize the cost function $f$. Since the cost function is not jointly convex in C and $\phi$, solving it efficiently requires starting with good initial values for the variables C and $\phi$. Then, the solution can be refined using an iterative technique. We now describe the initialization procedure.

Figure 3A:
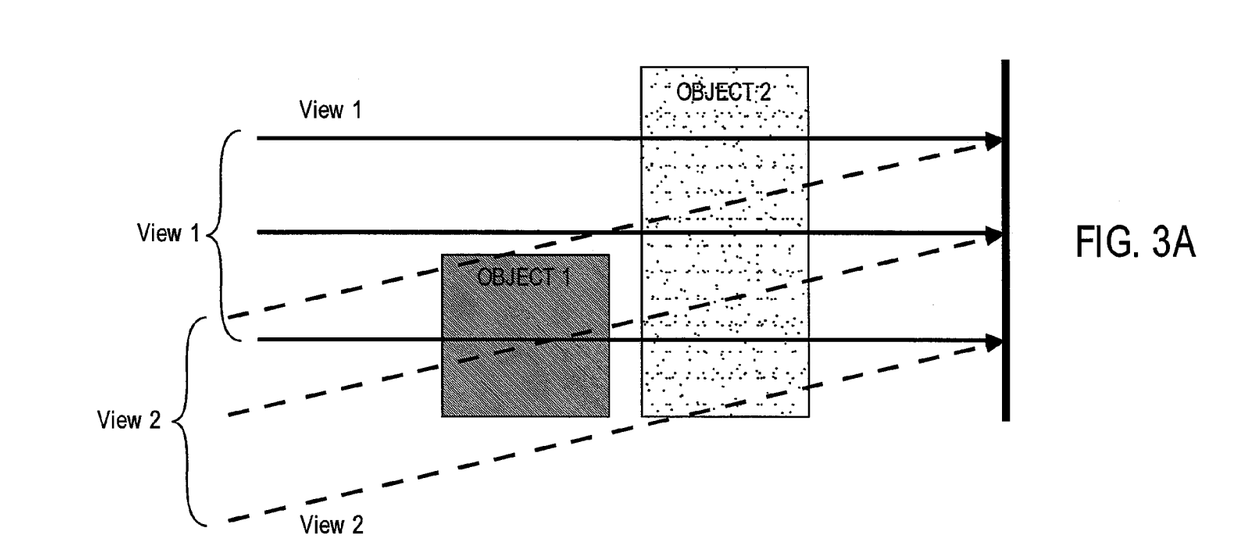
FIG. 3A and FIG. 3B are diagrams illustrating two views of same objects as seen from different angles.
Figure 3B:
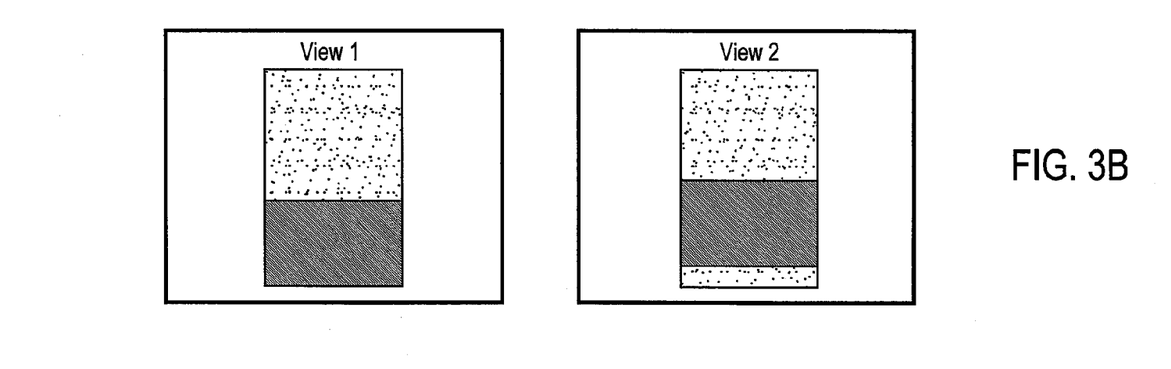

The initialization procedure consists of extracting candidate objects from SATIS data using what is herein referred to as Disparity-Enabled Clustering of Keypoints (DECK). The DECK method looks for rigid objects that move in a predictable way between views in 3D based on the motion of the camera. The DECK method is based on the premise that sets of points that have the same offsets (disparity) between two images likely belong to the same object. FIG. 3A and FIG. 3B illustrate the disparity change for two objects. In View 1, the right edge of Object 1 is flush with an edge of Object 2. In View 2, however, some of Object 2 is seen past the right edge of Object 1. In particular, Object 1 moves more between views than object 2 does because it is closer to the emitter. Together with other image cues, this allows the prediction of which points belong to the same objects and the method for producing a rough "outline" of the objects in a particular scan.

Figure 6:
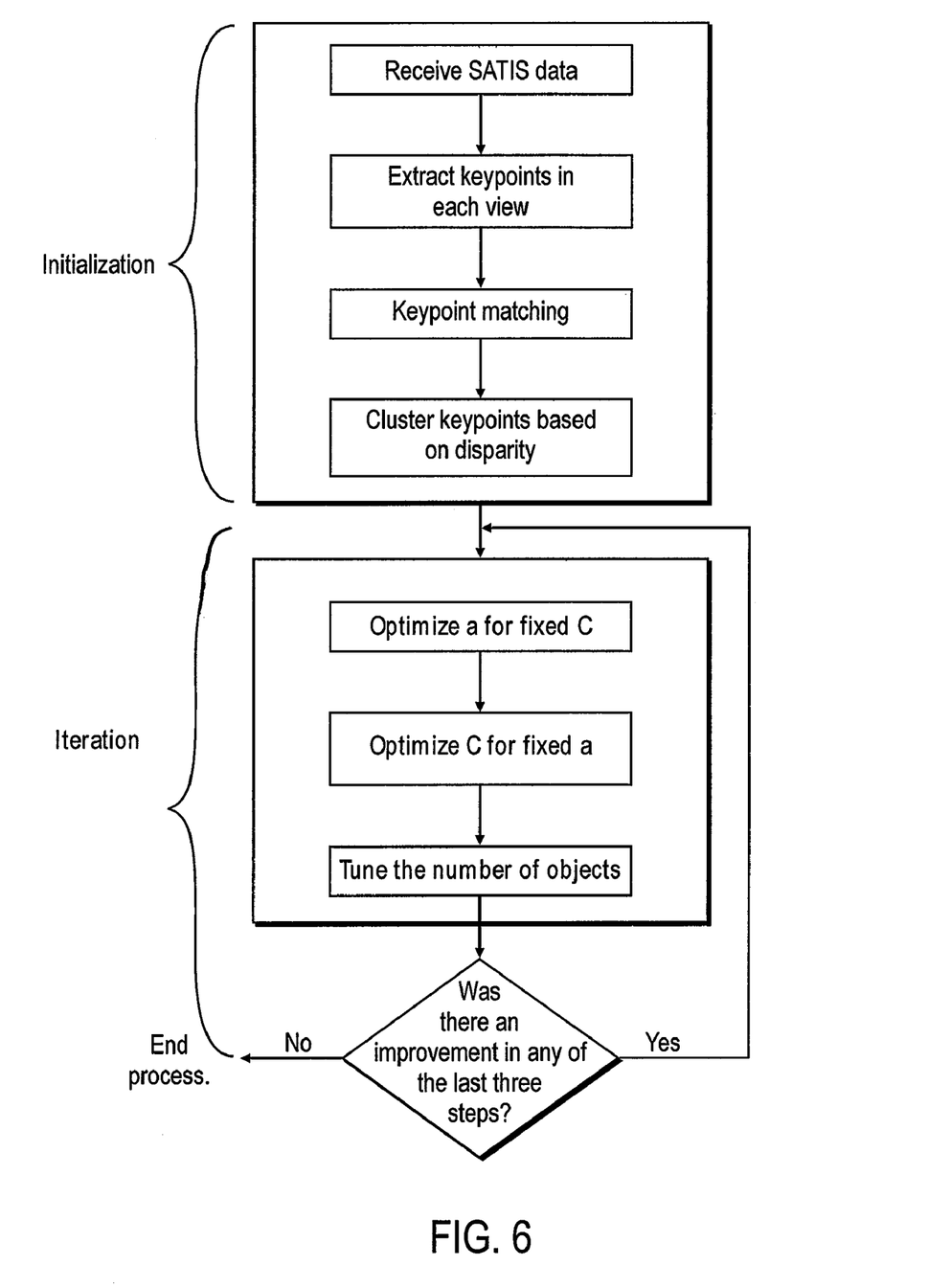
FIG. 6 is a flowchart summarizing the decomposition method of the invention.

The process of determining which points on an image belong to the same object is summarized in the flowchart of FIG. 6. FIG. 6 shows that the method of the invention may be divided into two parts: initialization and iteration. Initialization includes obtaining views from multiple angles and assigning keypoints to each view. The method extracts a large number (>100) of keypoints in each view of the data. These keypoints may be extracted using any standard interest operator, such as the SIFT keypoint detector, affine invariant patches or PCA coefficients, Harris-Affine Regions, MSERs, etc.

Figure 4:
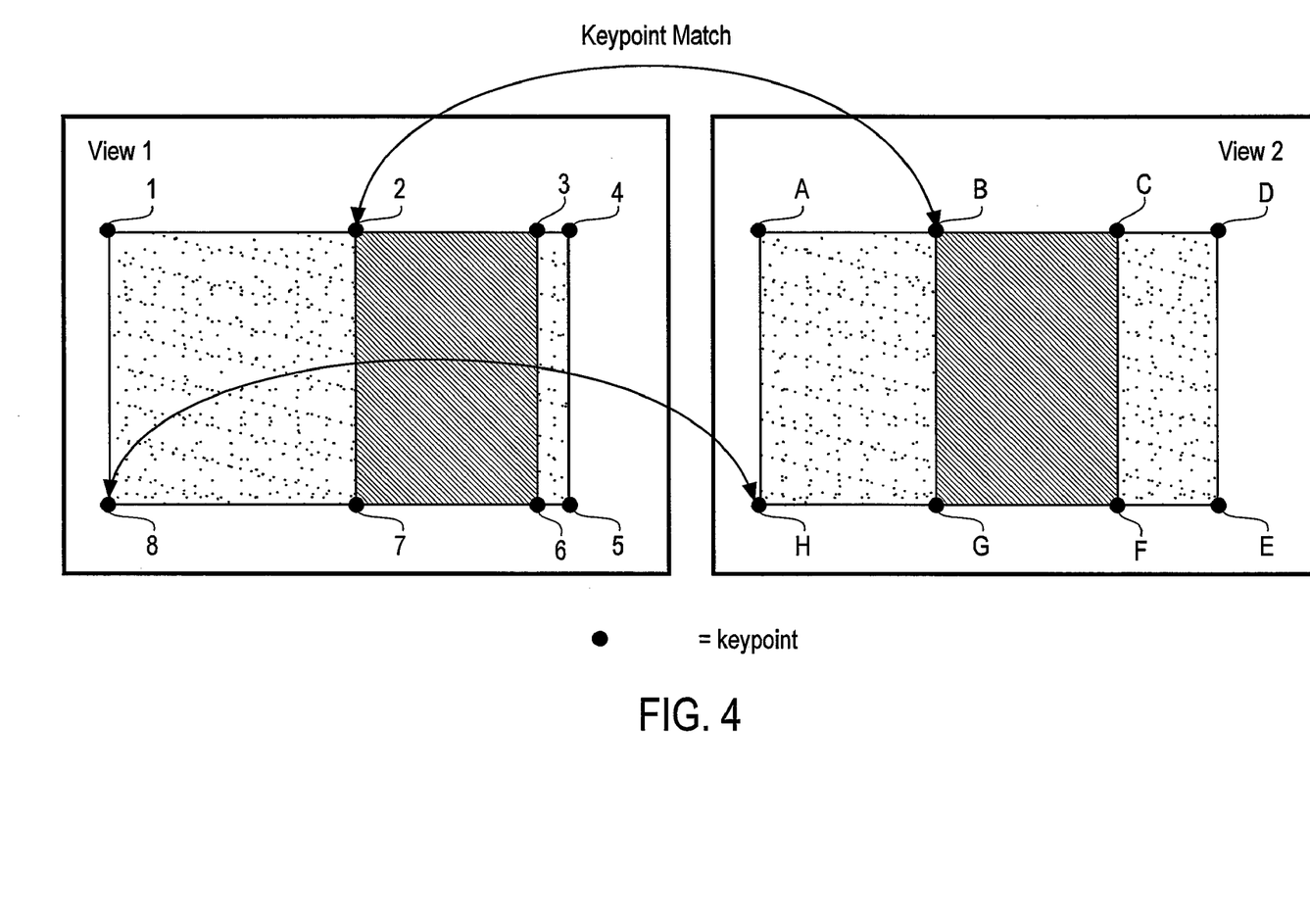
FIG. 4 is a diagram illustrating keypoint matching.

Following this extraction, keypoints are matched between the two images using a similarity measure over keypoint descriptors. For instance, one can use a Euclidean distance measure to calculate the similarity between the descriptors of two keypoints. Other distance metrics, such as $L_1$ distance or Earth Mover's Distance (EMD) may work better for some data. FIG. 4 is a diagram illustrating keypoint matching. In the example, Keypoint 2 in the left image matches Keypoint B in the right image. Better results will be achieved with more matches, but this algorithm will work with any number of matches.

Following keypoint matching, the disparity for each matched pair is determined. "Disparity," as used herein, refers to the distance in pixels between the location of the keypoint in the first image and the location of the corresponding keypoint in the second image. For a stationary object, this disparity is inversely proportional to the distance from the x-ray emitter, and is likely to be similar for points on the same object. Additional features besides disparity could also indicate that keypoints belong to the same object. For instance, the magnitude of the gradient around the keypoint could indicate the effective attenuation of an object for all keypoints that are located on the edge of an object.

Of all the views used to calculate the disparities, a reference view is selected. The keypoints of the reference view are then clustered into groups based on their disparities. Typically, keypoints with similar disparities (and possibly other features) between the two views are clustered into the same group. Clustering can be achieved using standard clustering methods such as K-means or hierarchical agglomerative clustering. The number of clusters is chosen using a model-complexity criteria, such as MDL or AIC/BIC.

Figure 5:
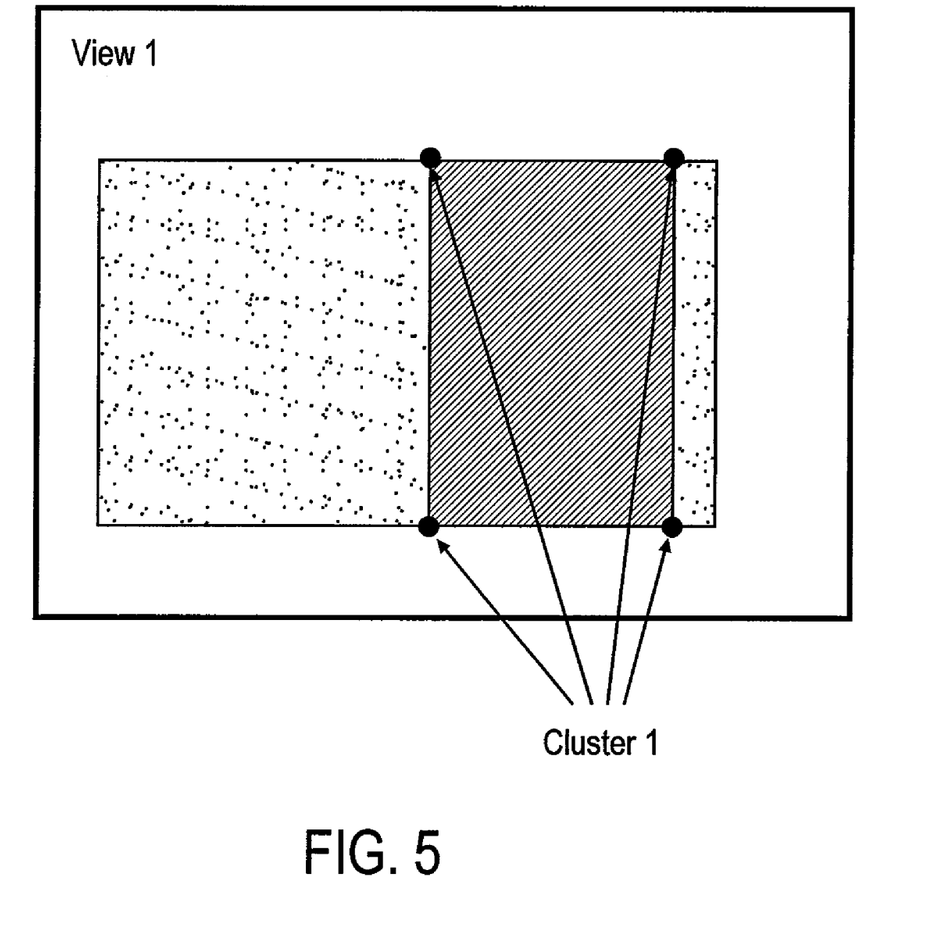
FIG. 5 is a diagram illustrating the clustering process.

FIG. 5 is a diagram illustrating the clustering process. Referring to View 1 of FIG. 4, keypoints 2, 3, 6, and 7 are identified as belonging to a single cluster. All keypoints from a cluster are likely to correspond to a single object, or a small number of objects. The composition matrix C is initialized by assuming that the number of objects are equal to the number of clusters, and all points inside the convex hull of cluster k were attenuated by the $k^{th}$ object (i.e., $C_{rk}=1$ for all regions r inside the $k^{th}$ cluster). This produces an initialization of C that will be refined during the iteration process.

Beginning with this composition matrix C, the iterative phase of the process is performed. During this second phase, the method iteratively updates the parameters in order to minimize the cost function $f(C, \phi; l)$. Each iteration involves three steps: (1) optimize $\phi$ given a fixed C, (2) optimize C given a fixed $\phi$, and (3) tune the number of objects.

The first step solves the optimization problem (Equation 1) for $\phi$, for a given composition matrix C. By making C a fixed value, this step reduces to solving a least-squares problem for the attenuation $\phi$, and can be solved using standard methods. For arbitrary C matrices, the method of Householder reflections is relatively efficient.

The second step of the optimization holds $\phi$ fixed, and re-optimizes Equation 1 for the composition matrix C. This problem can be solved in a number of ways. An example implementation relaxes the initial problem into a Quadratic Programming (QP) optimization problem by allowing the entries of C to take on real values between 0 and 1. The solution is then rounded to the nearest integral value to produce a "feasible" matrix, according to the original problem.

The third step uses discrete search operators to update the composition matrix C and the attenuation $\phi$ simultaneously. Some of the search operators considered include splitting an object into two, merging two objects into one, swapping objects within a single view, etc. Because the cost function is easy to compute, the method performs greedy search using this set of operators until it can no longer improve the cost function.

These three steps are then repeated until none of the three improves the cost function. The final composition matrix C and attenuation $\phi$ are returned as the decomposition of the image set.

The method described above produces as outputs a list of objects with their attenuation times thickness parameters (represented in the $\phi$) and a list of the pixels in each view that represent rays that pass through each object (represented as the columns of the composition matrices C). This decomposition is called an "image separation" of the dataset, and allows for individual objects to be classified as threats or non-threats.

Figure 7:
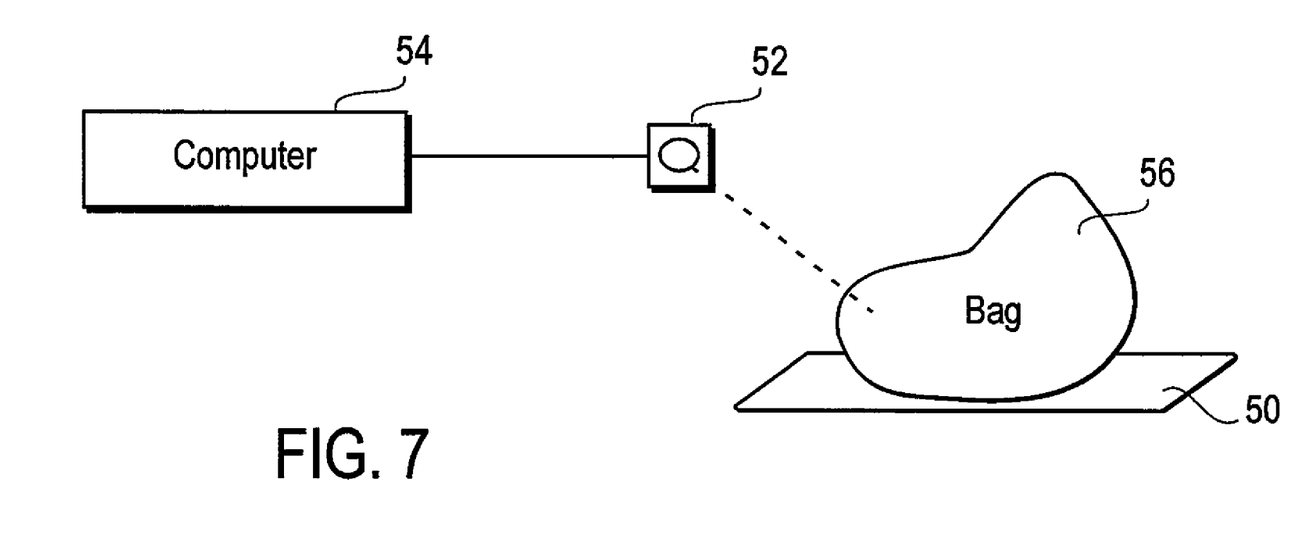
FIG. 7 illustrates an exemplary apparatus that may execute the method of the invention.

FIG. 7 illustrates an exemplary apparatus that may execute the method of the invention. The apparatus includes a platform 50 for holding a bag or a container 56, and an image device 52 that can scan the bag or container 56. A computer 54 receives data from the imaging device 52 and analyzes the data according to the above-described method. There are number of ways in which multiple images are obtained. In one embodiment, the imaging device 52 (e.g., an x-ray scanner) is in a fixed position and the bag or container is moved/turned, for example by moving or turning the platform 50. In another embodiment, the bag/container remains still while the imaging device 52 changes its position. In yet another embodiment, there may be multiple imaging devices 52. The bag/container is not limited to resting on the platform 50. For example, it may hang from a hanger. The computer 54 may be any device that has processing capability, a memory, and means of data input and output.

In the above description, some portions are presented in terms of steps, logic blocks, processing, and other symbolic representations of operations on data bits that can be performed on computer memory. Each step may be performed by hardware, software, firmware, or combinations thereof.

The computer 54 may be programmed with or store various parameter values of shape, dual energy attenuations (which can be converted into density and atomic number), and/or texture so that it can look for objects that match the parameter values. For example, if one wanted to screen for a handgun, one would instruct the computer 54 to look for a constituent object having a high atomic number and density (for metal) and a right angle in its shape. If one wanted to screen for explosives, one would instruct the computer 54 to look for a bulk of mid-range atomic number (indicating an organic material) near a thin and long high-atomic-number region representing a wire. Even if the handgun or the explosive is buried in a bag underneath layers of different materials, the method of the invention can be used to divide out the zones and apply keypoint matching and disparity calculation to determine the shape and composition of each object in the layers.

The method and apparatus described above is advantageous in that it allows scans of overlapping objects to be decomposed or transformed into individual objects even when the relative position of objects with respect to each other is not fixed. This is a major difference from methods of analysis of CT scans, which assume that the content of each voxel remains fixed across all scans, and as a result are very sensitive to moving objects. In fact, the method and apparatus of the invention may be used even with a bag that contains a deformable or moving object (e.g., a bottle of liquid), as long as most of the keypoints can be matched across views. This advantage differentiates the invention from decomposition methods that rely on CT scans or multiview.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

The invention claimed is:

1. A method of decomposing overlapping objects in a view into constituent objects, the method comprising:
   assigning, by using a processor, first keypoints in a first view and second keypoints in a second view, wherein the first view and the second view are actual views taken of same objects from different positions;
   matching, by using a processor, the first keypoints to the second keypoints to generate keypoint pairs;
   computing, by using a processor, a disparity between each of the keypoint pairs, wherein the disparity is a distance between a location of a keypoint in the first view and a location of a matching keypoint in the second view; and
   grouping the keypoints into clusters by using a processor, based on Disparity-Enabled Clustering of Keypoints (DECK).

2. The method of claim 1, wherein the grouping of the keypoints comprises grouping the keypoint pairs with similar disparities into one cluster.

3. The method of claim 1, wherein the grouping of keypoints consists of using multiple features of each keypoint, not limited to disparity.

4. The method of claim 1, wherein the matching of the keypoints comprises using at least one of keypoint descriptors and distance metrics.

5. The method of claim 1, wherein the disparity is measured in number of pixels.

6. The method of claim 1, wherein the first view and the second view are x-ray images.

7. The method of claim 1 further comprising calculating a cost function $f(C, \alpha; l_v)$ according to the equation $$f(C, \varphi; l) = \sum_v \|l_v - C_v\varphi\|^2 + \sum_v \gamma\|S_v C_v\|^2 + \sum_{v,w} \beta\|C_v - T_{wv}C_w\|^2$$

wherein C is the composition matrix accounting for all pixels in a view, φ is the attenuation coefficient containing optimization variables relating to attenuation of the objects in the view, $l_v$ is a normalized log attenuation for a view v wherein v and w are two different views, S is a fixed matrix that enforces a smoothness prior on each single C, $T_{wv}$ is a transformation that maps a view w to a view v, γ (having a value >0) is the weight of within-scan smoothness penalty, and β (having a value >0) is the weight of between-scans smoothness penalty.

8. The method of claim 7 further comprising initializing the composition matrix C from the DECK clustering results, with each cluster representing an object.

9. The method of claim 8 further comprising solving the following problem for α with a fixed C:

$$\min_{C,\varphi} f(C, \varphi; l)$$
$$\text{s.t. } C_{vpi} \in \{0, 1\} \ \forall \ v, i, p.$$

10. The method of claim 9 further comprising re-solving the problem for C with a fixed attenuation coefficient φ.

11. The method of claim 10 further comprising using a discrete search operator to update C and φ simultaneously.

12. The method of claim 10 further comprising repeating the solving of the problem with a fixed C, re-solving of the problem with a fixed φ, and the simultaneous updating of C and φ until the cost function is no longer improved by the solving, the re-solving, and the updating.

13. A method for refining a SATIS decomposition into objects having consistent attenuation values, the method comprising:
   determining, using a processor, a composition matrix $C_v$ containing optimization variables relating to the pixel composition of the objects that were initialized based on the decomposed SATIS data;
   determining, by using a processor, an object attenuation vector φ containing optimization variables relating to the attenuation of the objects;
   performing, b processor, an iterative procedure for simultaneously solving for the composition matrix $C_v$ and the object attenuation vector φ.

14. A computer readable medium storing thereon computer executable instructions for a method of decomposing overlapping objects in a view into constituent objects, the method comprising:

assigning first keypoints in a first view and second keypoints in a second view, wherein the first view and the second view are actual views taken of same objects from different positions;

matching the first keypoints to the second keypoints to generate keypoint pairs;

computing a disparity between each of the keypoint pairs, wherein the disparity is a distance between a location of a keypoint in the first view and a location of a matching keypoint in the second view; and grouping the keypoints into clusters based on the disparity.

15. The computer readable medium of claim 14, wherein the grouping of the method comprises grouping the keypoint pairs with similar disparities into one cluster.

16. The computer readable medium of claim 14, wherein the matching of the method comprises using at least one of keypoint descriptors and distance metrics.

17. The computer readable medium of claim 14, wherein the matching of the method comprises matching all of the keypoints.

18. The computer readable medium of claim 14, wherein the disparity is measured in number of pixels.

19. The computer readable medium of claim 14, wherein the method further comprises calculating a cost function $f(C, \phi; l_v)$ according to the equation $$f(C, \varphi; l) = \sum_v \|l_v - C_v \varphi\|^2 + \sum_v \gamma \|S_v C_v\|^2 + \sum_{v,w} \beta \|C_v - T_{wv} C_w\|^2$$

wherein C is the composition matrix accounting for all pixels in a view, $\phi$ is the attenuation coefficient containing optimization variables relating to attenuation of the objects in the view, $l_v$ is a normalized log attenuation for a view v wherein v and w are neighboring views, S is a fixed matrix that enforces a smoothness prior on each single C, $T_{wv}$ is a transformation that maps a view w to a view v, $\gamma$ (having a value >0) is the weight of within-scan smoothness penalty, and $\beta$ (having a value >0) is the weight of between-scans smoothness penalty.

20. The computer readable medium of claim 19, wherein the method further comprises initializing the composition matrix C from the DECK clustering results, with each cluster representing an object.

21. The computer readable medium of claim 20, wherein the method further comprises solving the following problem for $\phi$ with a fixed C:

$$\min_{C,\varphi} f(C, \varphi; l)$$

$$\text{s.t. } C_{vpi} \in \{0, 1\} \ \forall \ v, i, p.$$

22. The computer readable medium of claim 21, wherein the method further comprises re-solving the problem for C with a fixed $\phi$.

23. The computer readable medium of claim 22, wherein the method further comprises using a discrete search operator to update C and $\phi$ simultaneously.

24. The computer readable medium of claim 23, wherein the method further comprises repeating the solving of the problem with a fixed C, re-solving of the problem with a fixed $\phi$, and the simultaneous updating of C and $\phi$ until the cost function is no longer improved by the solving, the re-solving, and the updating.

25. A computer readable medium storing thereon computer executable instructions for a method of improving a set of decomposed SATIS data into objects having consistent attenuation values, the method comprising:

determining a composition matrix $C_v$ containing optimization variables relating to the pixel composition of the objects that were initialized based on the decomposed SATIS data;

determining an object attenuation vector $\phi$ containing optimization variables relating to the attenuation of the objects;

performing an iterative procedure for simultaneously solving for the composition matrix $C_v$ and the object attenuation vector $\phi$.

* * * * *